United States Patent Office 2,907,731
Patented Oct. 6, 1959

2,907,731

EPOXIDE, MONOHYDRIC ALCOHOL-DIPHENOLIC ACID ESTER COMPOSITIONS AND THE MODIFICATION THEREOF WITH ALDEHYDE CONDENSATES

Sylvan Owen Greenlee, West Lafayette, Ind., assignor to S. C. Johnson & Son, Inc., Racine, Wis.

No Drawing. Application October 2, 1958
Serial No. 764,770

11 Claims. (Cl. 260—19)

This invention relates to new compositions resulting from the reaction of polyepoxides and monohydric alcohol esters of diphenol carboxylic acids and/or said compositions modified with aldehyde condensates in regulated proportions to give valuable materials useful in the manufacture of moldings, adhesives, films, etc. The expoxides used in making the new compositions contain an average of more than one epoxide group per molecule and are free from functional groups other than epoxide, carboxyl, and hydroxyl groups. The monohydric alcohol esters of diphenol carboxylic acids are esters having an aliphatic-aromatic structure and containing phenolic hydroxyl groups. The aldehyde condensate modifiers are fusible materials having free reactive sites. The invention includes the initial reaction mixtures as well as the intermediate and final reaction products derived therefrom.

An object of this invention is the production of new compositions from epoxides and diphenol carboxylic acid esters and said compositions modified with aldehyde condensates to form resins, varnishes, molding compositions, adhesives, etc.

Another object of this invention is the production of intermediate reaction compositions from the initial reaction mixtures of epoxides and diphenol carboxylic acid esters and said compositions modified with aldehyde condensates, which are capable of further reaction on the application of heat to form insoluble, infusible products.

Another object of this invention is the production of new admixtures of the materials set forth hereinabove which are stable at ordinary temperatures for relatively long periods of time, yet which may be polymerized into insoluble, infusible products with or without the addition of catalysts by the application of heat.

These and other objects and advantages will appear from the following description, with particular reference to specific examples which are to be considered as illustrative only.

In general the polyepoxides contemplated for use herein are compounds containing an average of more than one and up to about 20 epoxide groups per molecule. Epoxide groups for the purpose of this specification refer to groups wherein the epoxy oxygen bridges adjacent carbon atoms. Such compositions, free from functional groups other than epoxide, carboxyl and hydroxyl groups, are reactive with active hydrogen containing groups including the phenolic groups supplied by the contemplated esters of diphenol carboxylic acids. Typical epoxides which have been found to be operable are complex resinous polyepoxides, resinous polyepoxide polyesters, epoxidized natural oils and aliphatic polyepoxides.

The monohydric alcohol esters of diphenol carboxylic acids contemplated for use herein are esters of 4,4-bis-(hydroxyaryl) pentanoic acids and their equivalent. An exemplary ester is the allyl ester of 4,4-bis(4-hydroxyphenyl) pentanoic acid.

The aldehyde condensates are prepared from low molecular weight aldehydes and ammonia derivatives or phenols capable of being condensed with an aldehyde. It is necessary that the condensate remain soluble and fusible as well as contain reactive methanol groups or an active hydrogen atom attached to some other functional group.

The compositions of the instant invention are prepared by reacting an epoxide with a diphenol carboxylic acid ester and if desired modifying said compositions with the before-mentioned aldehyde condensates, usually in the presence of heat. Having generally described and set forth the objects of the invention, a more detailed description of operable components and reaction conditions will be given.

OPERABLE DIPHENOLIC ACID ESTERS

The monohydric alcohol esters of diphenol carboxylic acids employed in this invention are prepared by the reaction of monohydric alcohols with diphenol carboxylic acids such as those described in prior copending application Serial No. 672,356, filed July 17, 1957, entitled "Aralkyl Esters."

The diphenol carboxylic acids used in preparing the aralkyl esters must have two hydroxyaryl groups attached to a single carbon atom. The preparation of such an aryloxy acid is most conveniently carried out by condensing a keto acid with the desired phenol. To the best of applicant's knowledge, any keto acid or ester is operable in which a keto group is connected to a carboxy or carboalkoxy radical through an alkylene radical of at least 2 carbon atoms; however, experience in the preparation of bisphenol and related compounds indicates that the carbonyl group of the keto acid should be positioned next to a terminal methyl group in order to obtain satisfactory yields. Further, while a broad class of acids is contemplated such as the keto substituted pentanoic, hexanoic and heptanoic acids, the pentanoic acid, levulinic acid, is preferred since it is readily available.

Prior copending applications, Serial Nos. 464,607 and 489,300 filed October 25, 1954, and February 18, 1955, respectively, disclose a number of illustrative compounds suitable for use as the diphenol carboxylic acid and methods of preparing the same. These materials which are referred to for convenience as diphenol carboxylic acids or by the trade name DPA, consist of the condensation products of levulinic acid or its equivalent and phenol, substituted phenols or mixtures thereof. It is to be understood that the phenolic nuclei of the diphenol carboxylic acids may be substituted with any group which will not interfere with the reactions contemplated herein. Such groups are the halo, nitro and alkyl groups of 1 to 5 carbon atoms. The chloro and bromo phenols are the preferred halogenated materials although it is possible under proper conditions to condense fluoro substituted phenols with a keto acid. Diphenol carboxylic acids derived from substituted phenols such as the alkylated phenols are sometimes more desirable than the products obtained from unsubstituted phenols due to properties imparted by the substituted groups. For instance, the alkyl groups provide better solvent solubility in selected solvents, flexibility and water resistance. However, the unsubstituted product is usually more readily purified. In the before mentioned condensation reaction between the phenol and keto acid it has been found, as one would expect, that the reaction occurs so that the phenolic hydroxyl group of the diphenol carboxylic acid is in a position para or ortho to the point of attachment of the hydroxyaryl radical to the pentanoic acid. Very little or no condensation occurs at the keto position.

Acids A to D inclusive, illustrate typical diphenol carboxylic acids. Proportions expressed are parts by weight unless otherwise indicated. Acid values as used herein represent the number of milligrams of KOH required to neutralize a one gram sample.

A

A mixture consisting of 376 parts of phenol, 116 parts of levulinic acid, and 250 parts of 37% aqueous hydrochloric acid was agitated at 48°–52° C. for 66 hours. The top layer was removed from the aqueous hydrochloric acid layer by decantation. The product was then purified by vacuum distillation of the volatile unreacted materials by heating to 180° C. at 32 mm. pressure. The residual product amounted to 247 parts (86.5% theoretical) and had a softening point of 80° C. and an acid value of 155. Purification of this product by dissolving in an aqueous bicarbonate solution, reprecipitating with mineral acid, followed by recrystallization from hot water gave a white crystalline compound melting at 171°–172° C. with an acid value of 196.

Softening points as used herein were run by Durrans' Mercury Method (Journal of Oil and Colour Chemists Association, 12 173–5, 1929).

B 240.5 grams (2.18 mols) ortho cresol, 156 grams (37%) HCl, and 145 grams levulinic acid were charged to a 2-liter round bottom flask equipped with thermometer, reflux condenser and mechanical agitator. The temperature was raised to 50° C. in approximately 1 hour and held in this range for an additional 72 hours. The recovered material was washed 6 times with boiling water before steam distilling. The resultant crude material had an acid value of 156, a saponification No. of 206 and was recovered at 74% of theoretical based on levulinic acid.

This crude material was refluxed with aqueous sodium hydroxide for approximately 1 hour and the material reacidified, washed and filtered. The material was recrystallized from hot benzene and dried in a vacuum oven. The resultant material had an acid value of 169, theoretical 178, saponification value of 175, theoretical 178 and a melting point of 149°–150° C.

C 363 parts of the ethyl ester of 4,4-bis(4-hydroxyphenyl) pentanoic acid prepared as in A and 344 parts of sulfonyl chloride were charged to a 3-necked flask equipped with thermometer, reflux condenser, and mechanical stirrer. The reaction immediately exothermed and was cooled with a water bath maintaining the temperature at approximately 25° C. for 1 hour. The reaction charge became thick and then solidified with a pronounced temperature rise. The reaction mixture had a yellow color. Excess sulfonyl chloride was removed under slight pressure. The obtained ester had a chlorine content of 21.38% corresponding to the addition of approximately 2 chlorine atoms (theoretical equals 18.5%). The chlorinated ester was saponified to obtain the corresponding acid.

D 172 parts DPA prepared as in A and 450 parts glacial acetic acid were charged to a 3-necked flask equipped with a thermometer, reflux condenser, and mechanical stirrer. The resultant solution was tan in color. 264 parts of benzene were added to the charge before cooling to 0° C. in an ice bath. At this temperature, drop-wise addition of 85.8 parts 70% nitric acid diluted with 66 parts of glacial acetic acid was begun. The complete addition required 3 hours and 45 minutes with the reaction temperature never exceeding 0° C. The reaction charge at the end of the addition was a clear dark reddish solution. The charge was allowed to stir at temperatures between 5° and 20° C. for approximately 12 hours. At the end of this time, a heavy orange precipitate had formed. The precipitate was filtered and washed 3 times with distilled water before it was vacuum dried. The resultant crude material recovered at 84.5% of theoretical, had an acid value of 488 (theoretical equals 447) and a melting point of 102–4° C. The crude material was recrystallized from a mixture of hot ethanol and water to give a fine yellow crystalline material having a melting point of 137.5°–140° C., a nitrogen content of 7.20% (theoretical equals 7.44%) and an acid value of 445.

The monohydric alcohols which may be used in the esterification of the diphenol carboxylic acids include all stable types, saturated, unsaturated, waxy or resinous. Operable alcohols thus embrace the saturated alcohols such as methyl, ethyl, butyl, amyl, heptyl, octyl, lauryl and through octadecyl alcohol as well as the more waxy alcohols containing up to about 36 carbon atoms such as those derived from carnauba wax. The unsaturated alcohols include allyl, methallyl, 9-undecenyl, octadecenyl through octadecadienyl alcohol and the longer chain unsaturated alcohols up to about 36 carbon atoms. A third important operable class comprises the saturated and unsaturated resinous alcohols such as those derived from rosin and other resinous terpenic materials. The above alcohols are available from a number of commercial sources and can be conveniently derived from vegetable oils, fish oils, natural occurring waxes, etc.

It has been found that the esters contemplated for use herein have their properties varied widely by the proper selection of monohydric alcohol used to esterify the diphenol carboxylic acids. The short-chain esters, such as the methyl ester, while providing little plasticizing action, impart considerable variation to the compatibility of the intermediate products with various ingredients including the polyepoxides. As the chain length of the monohydric alcohol increases, an increasing amount of plasticizing action is obtained so that those products prepared from monohydric alcohols containing, for example, 10 or more carbon atoms in the chain, are highly plasticized. Resinous compositions plasticized in this manner have the plasticizing groups chemically bonded therewith and are thus superior to conventional compositions where the plasticizers are only physically mixed. Such plasticizing groups cannot be leached out and do not evaporate from films containing the same, and also contribute superior flexibility and toughness as well as chemical resistance.

As with the saturated alcohols, the unsaturated monohydric alcohols contribute variation in miscibility with other ingredients and depending on the chain length, plasticizing action. In addition, however, these alcohols contribute the olefin groups which are subject to polymerization. These olefin groups can then be used, by proper formulation, as functional groups for polymerization to infusible, insoluble products by oxidation, such as exposure of thin protective coating films to air for long periods of time or by the application of heat. The use of long chain unsaturated alcohols, such as the products prepared by selective ester group reduction of unsaturated vegetable and fish oil acid esters are particularly advantageous in preparing the monohydric alcohol esters of the aryloxy-substituted acids for use in the compositions of this invention since they are relatively cheap, highly plasticizing and furnish considerable olefinic unsaturation.

Another valuable variation in the characteristics of the monohydric alcohol ester is obtained by using resinous monohydric alcohols. The resinous monohydric alcohols, such as the saturated or unsaturated catalytic reduction products of rosin, are relatively cheap commercial ingredients which contribute to hardness and the general resinous properties of conversion products of this invention prepared therefrom. Such resinous monohydric alcohols, when incorporated as the diphenol carboxylic acid ester in these compositions, contribute greatly to the gloss characteristics of protective coatings made from these compositions.

It is therefore apparent from the above disclosure that the monohydric alcohols contemplated for use in making the diphenolic esters disclosed herein are relatively non-critical. The monohydric alcohol selected is to a large extent dependent upon the end use and final characteristics desired in the composition. Thus, operable alcohols can be described as those capable of esterifying a diphenol carboxylic acid and free of competing functional groups. Usually these will be alcohols containing only the elements carbon, hydrogen and oxygen. However, alcohols containing amino, nitro, sulfo, etc. substituted groups are not excluded so long as they do not interfere with the contemplated reactions and are equivalent to the above disclosed alcohols for purposes of the instant invention.

The diphenol carboxylic acid esters are conveniently prepared by methods well known in the art. The higher molecular weight esters can be made by direct heating at temperatures of from 170°–275° C. under conditions where the water produced during the condensation is continuously removed as it is formed. The water removal can be accomplished by simply permitting it to volatilize during the condensation or the removal can be facilitated by bubbling an inert gas, such as nitrogen or carbon dioxide, through the reaction mixture or by the use of an inert solvent. The esters of low molecular weight or volatile alcohols can be prepared by suitable alterations of the above general procedure. This will become apparent from the following examples.

Examples 1 to 9 inclusive illustrate the preparation of a selected group of diphenol carboxylic acid esters. It is to be understood that the examples are illustrative only and are not meant to limit the herein disclosed invention. Further, it should be appreciated that in all instances it is not necessary to completely purify the esters. Minor amounts of impurities or unreacted reactants have not been found to effect the final composition obtained therefrom. Proportions as used in the following examples are parts by weight unless otherwise indicated.

*Example 1*

A mixture of 1000 parts of 4,4-bis(4-hydroxyphenyl)-pentanoic acid, 800 parts of methanol, and 3 parts of p-toluenesulfonic acid was refluxed 18 hours and poured into 6400 parts of methanol. To this solution 24,000 parts of water were added and the ester crystallized out on standing. The product was collected by filtration and dried in an oven at 150° C. to give 1010 parts of methyl 4,4-bis(4-hydroxyphenyl) pentanoate. This material was recrystallized from water or a mixture of methanol and water to give the pure ester melting at 131–2° C. and having a saponification value of 186 (theoretical equals 187).

*Example 2*

A mixture of 572 parts of a diphenol carboxylic acid, prepared from phenol and levulinic acid, and 600 parts of allyl alcohol in a 3-neck flask provided with a thermometer, a mechanical agitator, and reflux condenser was refluxed for a period of 14 hours. The condenser was changed for collection of distillation and the excess allyl alcohol was removed by heating to 150° C. during which time a water leg vacuum of about 30 mm. pressure was applied. The product had an acid value of 12. Acid value is defined as the number of milligrams of KOH necessary to neutralize one gram of sample.

*Example 3*

A mixture of 286 parts of a diphenolcarboxylic acid, prepared from phenol and levulinic acid, and 268 parts of Makanol 8 (an alcohol produced by Stepan Chemical Company prepared by reduction of soyabean oil and having a specified iodine value range of 138–154, a hydroxyl value 204–209, an average molecular weight 265.3 and containing 88% of unsaturated alcohols and 12% saturated alcohols) in a 3-neck flask provided with a thermometer, a mechanical agitator, and reflux condenser attached through a water trap was gradually heated to 205° C. A sufficient amount of xylene was added to give refluxing at the esterification temperature. The continuously agitated mixture was heated at 205–240° C. for 4½ hours and held at 240° C. for an additional 30 minutes during which time a water leg vacuum of about 30 mm. pressure was applied to remove the last traces of xylene. This product had an acid value of 6.

*Example 4*

A mixture of 286 parts of a diphenol carboxylic acid, prepared from phenol and levulinic acid, and 268 parts of Makanol 9 (an alcohol produced by Stepan Chemical Company prepared by reduction of linsed oil and having a specified iodine value range of 193–225, a hydroxyl value of 204–209, an average molecular weight of 265.3, and containing 91% unsaturated alcohols and 9% saturated alcohols) in a 3-neck flask provided with a thermometer, a mechanical agitator, and reflux condenser attached through a water trap was gradually heated to 175° C. A sufficient amount of xylene was added to give refluxing at the esterification temperature. The continuously agitated mixture was heated at 180–220° C. for a period of 7½ hours and then taken to 240° C. for an additional 30 minutes during which time a water leg vacuum of about 30 mm. pressure was applied to remove the last traces of xylene. This product had an acid value of 5.

*Example 5*

In a manner similar to that followed in Example 3 286 parts of 4,4-bis(4-hydroxyphenol) pentanoic acid and 270 parts of Stenol, a commercial grade of stearyl alcohol marketed by E. I. du Pont de Nemours, were reacted to give a product having an acid value of 13.

*Example 6*

In a manner similar to that followed in Example 2 286 parts of 4,4-bis(4-hydroxyphenol) pentanoic acid and 130 parts of 2-ethyl hexanol were reacted to give a product having an acid value of 20.

*Example 7*

A mixture of 177 parts of the chloro diphenolcarboxylic acid of C and 74 parts of n-butyl alcohol was charged to a round bottom 3-necked flask fitted with a mechanical agitator, thermometer and reflux condenser. Over a period of ½ hour the temperature was raised to 110° C. at which temperature the refluxing began. Over a period of approximately 10 hours the temperature was increased to 150° C. with the water of condensation being removed from the reaction as it is formed. Final traces of water and excess butyl alcohol were removed using a slight vacuum. The resultant product was an amber, solid material which tended to be crystalline, had an acid value of 9 and a saponification value of 144 (theoretical equals 137).

*Example 8*

188 parts of the nitro diphenol carboxylic acid of D and 65 parts of n-octyl alcohol were charged to a round bottom flask fitted with an agitator, thermometer and reflux condenser. The temperature was raised to 140° C. over a period of approximately 30 minutes. At this temperature a water trap was inserted between the reaction flask and reflux condenser in order to remove the water of condensation. The temperature was increased to 200° C. over a period of approximately 6 hours and held for approximately 5 hours before the final traces of the octyl alcohol were removed by vacuum distillation. The resultant product was a soft resinous material with an acid value of 20 and an ester number of 101 (theoretical equals 115).

Example 9

A mixture of 314 parts of the ortho cresol DPA of B and 194 parts of lauryl alcohol was charged to a round bottom flask fitted with thermometer, mechanical agitator, reflux condenser and water trap. The temperature was raised to 95° C. before sufficient xylene was added to help control the esterification reaction. The temperature was then increased to 180° C. over a period of 40 minutes and held in this range for 6 hours. The temperature was further increased to 200° C. and held in this range for 2 additional hours before final traces of xylene and alcohol were removed by vacuum distillation. The resultant product had an acid value of 6, a saponification number of 120 (theoretical equals 115) and an ester number of 114.

In Examples 1 to 9 inclusive, other diphenol carboxylic acids can be used including chloro, bromo, nitro and alkyl groups of 1 to 5 carbon atoms exemplified by 4,4-bis(4-hydroxy-3-ethyl phenyl) pentanoic acid, 4,4-bis(4-hydroxy-3, 5-isopropyl phenyl) pentanoic acid, 4,4-bis(4-hydroxy-2-ethyl phenyl) pentanoic acid, 4,4-bis(2-hydroxy-4-butyl phenyl) pentanoic acid, 4,4-bis(4-hydroxy-2,5-diamyl phenyl) pentanoic acid, 4,4-bis(4-hydroxy-3-nitro phenyl) pentanoic acid, 4,4-bis(2-hydroxy-3-nitro-phenyl) pentanoic acid, 4,4-bis(4 - hydroxy - 3 - methyl phenyl) pentanoic acid, 4,4-bis(4-hydroxy-3-amyl phenyl) pentanoic acid, 4,4-bis(4-hydroxy-3-chloro phenyl) pentanoic acid, 4 - (4 - hydroxyphenyl)-4-(4-hydroxy-3-amyl phenyl) pentanoic acid, 4-(4-hydroxyphenyl)-4-(2-hydroxy-4-chlorophenyl) pentanoic acid, 4-(4-hydroxyphenyl) - 4 - (4-hydroxy-3,5-dibromo phenyl) pentanoic acid, 4-(4-hydroxyphenyl)-4-(2-hydroxy-4-nitro phenyl) pentanoic acid, 4-(4-hydroxyphenyl)-4-(4-hydroxy-3-sulfo phenyl) pentanoic acid, 4-(4-hydroxyphenyl)-4-(2-hydroxy-3,5-dimethyl phenyl) pentanoic acid, 4,4-bis(2-hydroxy-4-butyl phenyl) pentanoic acid, 4,4-bis(2-hydroxy-5 methyl-3 chloro phenyl) pentanoic acid, 4,4-bis(4-hydroxy-3,5-dibromo phenyl) pentanoic acid, 4,4-bis (4-hydroxy-3,5-dinitro phenyl) pentanoic acid, 4,4-bis(2-hydroxy-3 nitro-5 methyl phenyl) pentanoic acid, 4,4-bis(4-hydroxy-3-methyl-5 chloro phenyl) pentanoic acid, 5,5-bis(4-hydroxy phenyl) hexanoic acid, 5,5-bis(4-hydroxy-3-methyl phenyl) hexanoic acid, 5,5-bis(4-hydroxy-3-nitro phenyl) hexanoic acid, and 5,5-bis(4-hydroxy-3-chloro phenyl)hexanoic acid.

In Examples 1 to 9 inclusive other monohydric alcohols can be used including ethanol, propanol, isopropanol, propenol, pentanol, heptanol, decyl alcohol, tetradecanol, 2-ethyl butanol, heptadecanol, methallyl alcohol, oleyl alcohol, amino methylpropyl alcohol, octadecadienyl alcohol, benzyl alcohol, cetyl alcohol and 2-phenyl ethanol.

OPERABLE EPOXIDES

Illustrative of the epoxide compositions which may be employed in this invention are the complex epoxide resins which are polyether derivatives of polyhydric phenols with such polyfunctional coupling agents as polyhalohydrins, polyepoxides, or epihalohydrins. These compositions may be described as polymeric polyhydric alcohols having alternating aliphatic chains and aryl nuclei connected to each other by ether linkages, containing terminal epoxide groups and free from functional groups other than epoxide and hydroxyl groups. It should be understood that significant amounts of the monomeric reaction products are often present. This would be illustrated by I to III below where $n$ equals zero. Preparation of these epoxide materials as well as illustrative examples are described in U.S. patents, 2,456,408, 2,503,726, 2,615,007, 2,615,008, 2,668,807, 2,688,805 and 2,698,315. Well-known commercial examples of these resins are the Epon resins marketed by the Shell Chemical Corporation. Illustrative of the preparation of these epoxide resins are the following reactions wherein the difunctional coupling agent is used in varying molar excessive amounts:

Polyhydric phenol and an epihalohydrin bis(hydroxyphenyl)isopropylidene + excess epichlorohydrin

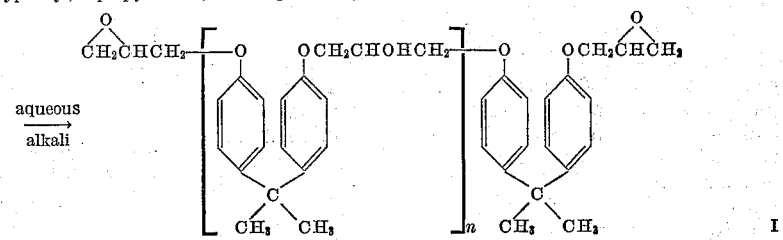

I

Polyhydric phenol and a polyepoxide bis(hydroxyphenyl)isopropylidene + excess butylene dioxide

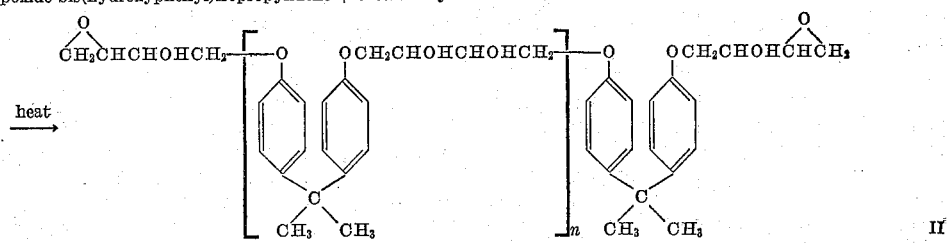

II

Polyhydric phenol and a polyhalohydrin bis(hydroxyphenyl)isopropylidene + excess alpha-glycerol dichlorohydrin

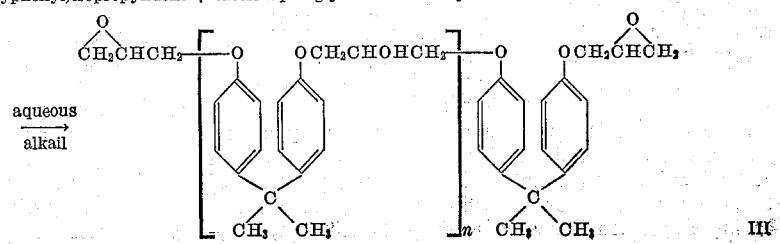

III

As used in the above formulas, $n$ indicates the degree of polymerization depending on the molar ratio of reactants. As can be seen from these formulas, the complex epoxide resins used in this invention contain terminal epoxide groups and alcoholic hydroxyl groups attached to the aliphatic portions of the resin, the latter being formed by the splitting of epoxide groups in the reaction of the same with phenolic hydroxyl groups. Ultimately, the reaction with the phenolic hydroxyl groups of the polyhydric phenols is generally accomplished by means of epoxide groups formed from halohydrins by the loss of hydrogen and halogen as shown by the following equation:

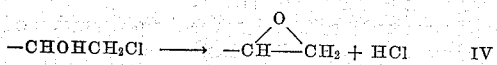    IV

Other epoxide compositions which may be used include the polyepoxide polyesters which may be prepared by esterifying tetrahydrophthalic anhydride with a glycol and epoxidizing the product of the esterification reaction. In the preparation of the polyesters, tetrahydrophthalic acid may also be used as well as the simple esters of tetrahydrophthalic acid such as dimethyl and diethyl esters. There is a tendency with tertiary glycols for dehydration to occur under the conditions used for esterification so that generally the primary and secondary glycols are the most satisfactory in the polyester formation. Glycols which may be used in the preparation of this polyester composition comprise, in general, those glycols having 2 hydroxyl groups attached to separate carbon atoms and free from functional groups which would interfere with the esterification or epoxidation reactions. These glycols include such glycols as ethylene glycol, diethylene glycol, triethylene glycol, tetramethylene glycol, propylene glycol, polyethylene glycol, neopentyl glycol, and hexamethylene glycol. Polyepoxide polyesters may be prepared from these polyesters by epoxidizing the unsaturated portions of the tetrahydrophthalic acid residues in the polyester composition. By properly proportioning reactants in the polyester formation and regulating the epoxidation reaction, polyepoxides having up to 12 or more epoxide groups per molecule may be readily prepared. These polyepoxide polyester compositions as well as their preparation are more fully described in a copending application having Serial No. 503,323, filed April 22, 1955.

Polyepoxide compositions useful in this invention also include the epoxidized unsaturated natural oil acid esters, including the unsaturated vegetable, animal, and fish oil acid esters made by reacting these materials with various oxidizing agents. These unsaturated oil acid esters are long chain aliphatic acid esters containing from about 15 to 22 carbon atoms. These acids may be esterified by simple monohydric alcohols such as methyl, ethyl, or decyl alcohol, by polyhydric alcohols such as glycerol, pentaerythritol, polyallyl alcohol, or resinous polyhydric alcohols. Also suitable are the mixed esters of polycarboxylic acids and long chain unsaturated natural oil acids with polyhydric alcohols, such as glycerol and pentaerythritol. These epoxidized oil acid esters may contain more than 1 up to 20 epoxide groups per molecule. The method of epoxidizing these unsaturated oil acid esters consist of treating them with various oxidizing agents, such as the organic peroxides and the peroxy acids, or with one of the various forms of hydrogen peroxide. A typical procedure practiced in the art consists of using hydrogen peroxide in the presence of an organic acid, such as acetic acid and a catalytic material, such as sulfuric acid. More recently epoxidation methods have consisted of replacing the mineral acid catalyst with a sulfonated cation exchange material, such as the sulfonated copolymer of styrene divinylbenzene.

The epoxide compositions which may be used in preparing the compositions of this invention also include aliphatic polyepoxides which may be illustrated by the products obtained by polymerizing allyl glycidyl ether through its unsaturated portion. In the polymerization of these ethers there is probably some polymerization occurring through the epoxide groups, and in addition some splitting of the epoxide groups to form hydroxyl groups so that pure compounds are not usually obtained.

Other aliphatic polyepoxides useful in this invention may be illustrated by the poly(epoxyalkyl) ethers derived from polyhydric alcohols. These materials may, in general, be prepared by reacting an aliphatic polyhydric alcohol with an epihalohydrin in the presence of a suitable catalyst and in turn dehydrohalogenating the product to produce the epoxide composition. The production of these epoxides may be illustrated by the reaction of glycerol with epichlorohydrin in the presence of boron trifluoride followed by dehydrohalogenation with sodium aluminate as follows:

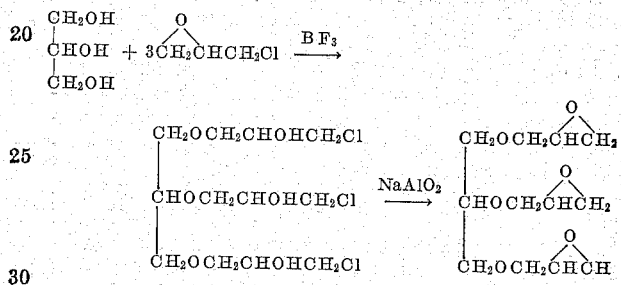

It is to be understood that such reactions do not give pure compounds and that the halohydrins formed and the epoxides derived therefrom are of somewhat varied character depending upon the particular reactants, their proportions, reaction time and temperature. In addition to epoxide groups, the epoxide compositions may be characterized by the presence of hydroxyl groups and halogens. Dehydrohalogenation affects only those hydroxyl groups and halogens which are attached to adjacent carbon atoms. Some halogens may not be removed in this step in the event that the proximate carbinol group has been destroyed by reaction with an epoxide group. These halogens are relatively unreactive and are not to be considered as functional groups in the conversion of the reaction mixture of this invention. The preparation of a large number of these mixed polyepoxides is described in the Zech patents, U.S. 2,538,072, 2,581,464, and 2,712,000. Still other polyepoxides which have been found to be valuable are such epoxide compositions as diepoxy butane, diglycid ether and epoxidized polybutadiene.

Immediately following will be a description or illustration of preparations of polyepoxides which will be used in examples of compositions of this invention.

The complex resinous polyepoxides used in the examples and illustrative of the commercially prepared products of this type are the Epon resins marketed by Shell Chemical Corporation. The following table gives the properties of some Epon resins which are prepared by the condensation in the presence of alkali of bis(4-hydroxyphenyl) isopropylidene with a molar excess of epichlorohydrin in varying amounts.

| Epon resin type | Melting point, °C. | Viscosity [1] (Gardner-Holdt) | Epoxide equivalent | Average molecular weight |
|---|---|---|---|---|
| Epon 864 | 40–45 | $A_1$–B | 325 | 450 |
| Epon 1001 | 64–76 | C–G | 480 | 640 |
| Epon 1004 | 95–105 | Q–U | 870 | 1,133 |
| Epon 1007 | 127–133 | Y–$Z_1$ | 1,750 | |
| Epon 1009 | 145–155 | $Z_2$–$Z_3$ | 3,200 | |

[1] Based on 40% nonvolatile in butyl Carbitol at 25° C.

Examples 10 through 12 describe the preparation of typical polyepoxide polyesters.

Example 10

In a 3-necked flask provided with a thermometer, mechanical agitator and a reflux condenser attached through a water trap was placed a mixture of 3 mols of tetrahydrophthalic anhydride and 2 mols of n-butanol. After melting the tetrahydrophthalic anhydride in the presence of the butanol, 2 mols of ethylene glycol were added. The reaction mixture was gradually heated with agitation to 225° C. at which point a sufficient amount of xylene was added to give refluxing at esterification temperature. The reaction mixture was then heated with continuous agitation at 225–235° C. until an acid value of 4.2 was obtained. This product gave an iodine value of 128.

EPOXIDATION OF THE POLYESTER RESIN

In a 3-necked flask provided with a thermometer, a mechanical agitator, and a reflux condenser was placed 107 parts of the dehydrated acid form of a cation exchange resin (Dowex 50 X–8, 50–100 mesh, Dow Chemical Company, a sulfonated styrenedivinylbenzene copolymer containing about 8% divinylbenzene, the percent divinylbenzene serving to control the amount of crosslinkage. The Dowex resins are discussed in publications entitled "Ion Exchange Resins No. 1" and "Ion Exchange Resins No. 2," copyright 1954 by Dow Chemical Company, the publications having form number Sp32–254 and Sp31–354, respectively) and 30 parts glacial acetic acid. The mixture of cation exchange resin and acetic acid was allowed to stand until the resin had completely taken up the acid. To this mixture was added 200 parts of the polyester resin dissolved in an equal weight of xylene. To the continuously agitated reaction mixture was added dropwise over a period of 45 minutes to 1 hour, 75 parts of 50% hydrogen peroxide. The reaction temperature was held at 60° C. requiring the application of some external heat. (In some preparations involving other polyester resins, sufficient exothermic heat is produced during the addition of hydrogen peroxide so that no external heat is required, or even some external cooling may be required.) The reaction was continued at 60° C. until a milliliter sample of the reaction mixture analyzed less than 1 milliliter of 0.1 N sodium thiosulfate in an iodometric determination of hydrogen peroxide. The product was then filtered, finally pressing the cation exchange resin filter cake. The acid value of the total resin solution was 42. The percent non-volatile of this solution amounting to 400 parts was 50. This 400 parts of solution was thoroughly mixed with 110 parts of the dehydrated basic form of Dowex 1 (an anion exchange resin of the quaternary ammonium type. Dowex 1 is a styrene-divinylbenzene copolymer illustrated by the formula RR'$_3$N+CH− where R represents the styrenedivinylbenzene matrix and R' is a methyl group, manufactured by the Dow Chemical Company). The resulting mixture was then filtered followed by pressing as much of the solution as possible from the anion exchange resin cake. This product had an acid value of 4.5 and an epoxide equivalent of 288 based on a non-volatile resin content of 42.0%. The epoxide values as discussed herein were determined by refluxing for 30 minutes a 2-gram sample with 50 milliliters of pyridine hydrochloride in excess pyridine. (The pyridine hydrochloride solution was prepared by adding 20 milliliters of concentrated HCl to a liter of pyridine.) After cooling to room temperature, the sample is then back-titrated with standard alcoholic sodium hydroxide.

Example 11

Following the procedure of Example 10, a polyester resin was prepared from 5 mols of tetrahydrophthalic anhydride, 4 mols of diethylene glycol, and 2 mols of n-butanol. This product had an acid value of 5.3 and an iodine value of 107. This polyester resin was epoxidized in the manner previously described to give an epoxide equivalent weight of 371 on the non-volatile content. The non-volatile content of this resin solution as prepared was 40.2%.

Example 12

The process of Example 10 was followed to obtain a polyester resin from 1.1 mols of tetrahydrophthalic anhydride, 1 mol of 1,4-butanediol and 0.2 mol of n-butanol. The product had an acid value of 8.6. This polyester resin was epoxidized in the same manner to give an epoxide equivalent weight of 292 and an acid value of 5.2 on the non-volatile content. The non-volatile content of this resin solution was 41.9%.

Examples 13 and 14 describe the preparation of epoxidized vegetable oil acid esters.

Example 13

(a) *Preparation of alkyd resin.*—To a kettle provided with a condenser was added 290 parts of white refined soya bean oil. While bubbling a continuous stream of nitrogen through this oil the temperature was raised to 250° C., at which temperature 0.23 part of litharge was added and the temperature held at 250° C. for 5 minutes. While holding the temperature above 218° C., 68 parts of technical pentaerythritol was added after which the temperature was raised to 238° C. and held until a mixture of 2½ parts of the product and 1 part of methyl alcohol showed no insolubility (about 15 minutes). At this point 136 parts of phthalic anhydride was added and the temperature gradually raised to 250° C. and held at this temperature for 30 minutes. At this point the condenser was removed from the kettle and the pressure reduced somewhat by attaching to a water aspirator evacuating system. With continuous agitation the mixture was then held at 250° C. until the acid value had reached 10.5. At this point the resin was thinned with xylene to 48% non-volatile content having a viscosity of H (Gardner Bubble Viscosimeter).

(b) *Epoxidation of a soya bean oil acid modified alkyd resin.*—In a 3-neck flask provided with a thermometer, a mechanical agitator and a reflux condenser was placed 70 parts of dehydrated acid form of a cation exchange resin (Dowex 50X–8) and 15 parts glacial acetic acid. The mixture of cation exchange resin and acetic acid was allowed to stand until the resin had completely taken up the acid. To this mixture was added 315 parts of the alkyd resin solution described in the above paragraph and 190 parts of xylene. To the continuously agitated reaction mixture was added dropwise 38 parts of 50% hydrogen peroxide. The reaction temperature was held at 60° C. until a milliliter sample of the reaction mixture analyzed less than one milliliter of 0.1 N sodium thiosulfate in an iodometric determination of hydrogen peroxide. The product was then filtered, finally pressing the cation exchange resin filter cake. The epoxide equivalent on the non-volatile content was 475.

In order to remove the free acidity from the epoxidized product, 400 parts of the solution was thoroughly mixed with 110 parts of the dehydrated basic form of Dowex 1 (an amine type anion exchange resin). The resulting mixture was then filtered, followed by pressing as much of the solution as possible from the anion exchange resin cake.

Example 14

Admex 710, an epoxidized soyabean oil having an equivalent weight to an epoxide of 263, was dissolved in methyl ethyl ketone to a non-volatile content of 50%. Admex 710, a product of the Archer-Daniels-Midland Company, has an acid value of 1, a viscosity of 3.3 strokes at 25° C. and an average molecular weight of 937.

Examples 15 and 16 describe the preparation of aliphatic polyepoxides.

Example 15

In a reaction vessel provided with a mechanical stirrer and external cooling means was placed 276 parts of glycerol and 828 parts of epichlorohydrin. To this reaction mixture was added 1 part of 45% boron trifluoride ether solution diluted with 9 parts of ether. The reaction mixture was agitated continuously. The temperature rose to 50° C. over a period of 1 hour and 45 minutes at which time external cooling with ice water was applied. The temperature was held between 50 and 75° C. for 1 hour and 20 minutes. To 370 parts of this product in a reaction vessel provided with a mechanical agitator and a reflux condenser was added 900 parts of dioxane and 300 parts of powdered sodium aluminate. With continuous agitation this reaction mixture was gradually heated to 92° C. over a period of 1 hour and 50 minutes, and held at this temperature for 8 hours and 50 minutes. After cooling to room temperature, the inorganic material was removed by filtration. The dioxane and low boiling products were removed by heating the filtrate to 205° C. at 20 mm. pressure to give a pale yellow product. The epoxide equivalent of this product was determined by treating a 1-gram sample with an excess of pyridine containing pyridine hydrochloride (made by adding 20 cc. of concentrated hydrochloric acid per liter of pyridine) at the boiling point for 20 minutes and back-titrating the excess pyridine hydrochloride with 0.1 N sodium hydroxide using phenolphthalein as indicator and considering one HCl as equivalent to one epoxide group. The epoxide equivalent on this product was found to be 152.

Example 16

In a 3-necked flask provided with a thermometer, mechanical agitator, reflux condenser and dropping funnel was placed 402 parts of allyl glycidyl ether. With continuous agitation the temperature was raised to 160° C. at which time one part of a 60% solution of methyl ethyl ketone peroxide dissolved in diethyl phthalate was added. The temperature was held at 160–165° C. for a period of 8 hours, adding one part of the methyl ethyl ketone peroxide solution each 5 minutes during the 8-hour period. After the reaction mixture had stood overnight, the volatile ingredients were removed by vacuum distillation. The distillation was started at 19 mm. pressure and a pot temperature of 260 C. The volatile material was finally removed at a pressure of 3 mm. and a pot temperature of 50° C. The residual product had a molecular weight of 418, and an equivalent weight to epoxide content of 198. The yield amounted to 250 parts.

OPERABLE ALDEHYDE CONDENSATES

Two general classes of aldehyde condensates are contemplated for preparing the modified products of this invention, those prepared from ammonia derivatives and those derived from phenols, with the choice being dependent on the end uses and characteristics desired. For instance, if the end use were to be a white enamel, the ammonia derivative-aldehyde condensates would probably be chosen because of their extremely light initial color and their good color retention. The phenols are somewhat darker in color and have a tendency to yellow upon aging. For the most desirable non-polar solvent solubility, the phenol-aldehyde condensates would be the proper choice since the ammonia derivative-aldehyde condensates usually require some butanol and xylol present to give the desirable solubility. For certain applications, the butanol odor is objectionable and at times butanol is incompatible with other resins which are used. Adhesion to metals also appears to be better in the phenol-aldehyde condensates and in addition have a price advantage.

The aldehyde-ammonia derivative condensation products are formed by the reaction of aldehydes with amines or amides such as urea, thiourea, and their derivatives, melamines and sulfonamides. It is necessary that the ammonia derivative contain at least one >NH group. Thus nitriles and tertiary amines which are also considered ammonia derivatives are excluded. Otherwise the definition reads on amides and primary and secondary amines. It is well known that such materials including a number of their derivatives react with aldehydes to form aldehyde-amine or aldehyde-amide condensates. Exemplary derivatives are substituted urea, thiourea, or melamine such as the long-chain alkyl-substituted materials which impart oil or organic solvent solubility. Suitable sulfonamides include aromatic mononuclear sulfonamides such as toluene sulfonamide, polynuclear sulfonamides such as naphthalene sulfonamide, sulfonamides of aromatic polynuclear ethers and mono- or polyfunctional sulfonamides. In addition to melamine, other operable ammonia derivatives containing the azide bridge are the amino di- and triazines.

In the condensation of aldehydes with the organic ammonia derivatives, initially the reaction appears to be the addition of aldehyde to the organic ammonia derivative to form primarily intermediate alkylol compounds. These compounds will further condense to form more resinous materials, combining with each other through alkylene bridges formed between the nitrogen atoms of the compounds.

In the alkylol condensate and in the more condensed products of an advanced stage of condensation, there are hydrogen atoms present in the hydroxyl groups which have been formed in the production of the alkylol condensate and which have not been destroyed by further condensation. There are also an appreciable number of hydrogen atoms attached to nitrogen atoms of the amide or amine groups present in the condensation products. These hydrogens contained in the hydroxyl groups and the amide or amine groups are active with respect to epoxide groups and will react therewith in the reaction mixtures of this invention to form complex, crosslinked products.

In general, the condensation products of ammonia derivatives and aldehydes contemplated herein are the partial and intermediate reaction or condensation products of aldehydes, particularly formaldehyde, with amines or amides, or mixtures thereof. The condensate can be in its monomeric form which is essentially an alkylol or polyalkylol product or it may be highly condensed. It is suitable as long as it is still fusible and is soluble in or compatible with the epoxide composition and the diphenol carboxylic acid ester composition with which it is to be reacted. The reactions which produce such condensation products involve the removal of amino or amido hydrogen atoms from the ammonia derivative. Therefore, it should be appreciated that an ammonia derivative as stated hereinbefore, in order to be suitable for condensation with an aldehyde, must contain at least one hydrogen atom attached to the nitrogen atom. Thus, the condensates may be made by various processes known in the art for the manufacture of aldehyde-ammonia derivative resins, resulting in water-soluble, alcohol-soluble or oil-soluble types.

Many of the commercial products derived from the reaction of urea, thiourea, or melamine with formaldehyde are mixed products made by reacting the formaldehyde with mixtures of these materials. Such composite or mixed reaction products can advantageously be used for reaction with the epoxides and the diphenol carboxylic acid esters according to the present invention. In addition, many of the present day commercial resins derived from aldehydes and urea, thiourea, or melamine, or a mixture thereof, are prepared in the presence of alcoholic or other solvents which take part in the reaction and become an integral part of the resulting resin composition. This is illustrated by the products prepared in the presence of butyl alcohol in which case the butyl alcohol to some extent condenses with the alkylol groups of the aldehyde condensate to give butyl ether residues as a part of the final composition. Such modified products are also suitable. In some cases it may be desirable to use an ammonia derivative-aldehyde condensate which is completely soluble in a common solvent or a mixture of solvents used to dissolve the epoxide and the diphenol carboxylic acid ester. Solutions prepared in this manner can be applied as a coating and the solvent subsequently evaporated before the main reaction involving the epoxide, diphenol carboxylic acid ester and condensate takes place.

Examples 17 to 21, inclusive, describe the preparation of typical ammonia derivative-aldehyde condensates suitable for use herein.

*Example 17*

In a 3-liter 3-neck flask provided with a mechanical agitator, a thermometer, and reflux condenser was placed 120 parts of urea, 600 parts of 37% aqueous formaldehyde, and 1040 parts of n-butyl alcohol. With continuous agitation the reaction mixture was heated to reflux temperature and the refluxing continued for a period of 1 hour. At this point a water trap was placed between the reflux condenser and flask and filled with toluene. Distillation was continued until 315 parts of water were removed from the reaction mixture. The resulting mixture was cooled to room temperature, filtered, and 1030 parts of a clear, water-white syrupy liquid isolated.

*Example 18*

The procedure of a preparation including the water removal was the same as that used in Example 17. A mixture of 304 parts of thiourea, 960 parts of 37% aqueous formaldehyde, and 800 parts of n-butyl alcohol was used to give a final yield of 1214 parts of a clear, light amber, syrupy product.

*Example 19*

The procedure of preparation including the removal of water was the same as that used in Example 17. A mixture of 120 parts of urea, 148 parts of thiourea, 950 parts of 37% aqueous formaldehyde, and 800 parts of n-butyl alcohol was used to give a final yield of 1175 parts of a clear, almost colorless, syrupy liquid.

*Example 20*

In a 3-liter 3-neck flask provided with a mechanical agitator, a thermometer, and a reflux condenser was placed 378 parts of melamine, 840 parts of 37% aqueous formaldehyde, and 725 parts of n-butyl alcohol. With continuous agitation the reaction mixture was heated to reflux temperature and the refluxing continued for a period of 30 minutes. At this point a water trap was placed in the distilling column between the flask and the reflux condenser and filled with toluene. The refluxing was continued until a total of 590 parts of water had been removed from the reaction mixture. The product amounting to 1342 parts was a clear, water-white, heavy, syrupy liquid.

*Example 21*

In a 3-liter 3-neck flask provided with a mechanical agitator, a thermometer, and a reflux condenser was placed 1370 parts of p-toluenesulfonamide and 640 parts of 37% aqueous formaldehyde the pH of which had been previously adjusted to 6.0 with potassium acid phthalate and sodium hydroxide. With continuous agitation the reaction mixture was heated to reflux temperature over a period of 40 minutes and the refluxing continued for a period of 15 minutes. At this point the reaction mixture was allowed to cool and the water decanted from the resin. The resin was washed 3 times with warm water and finally dehydrated in vacuum at 30–50 mm. pressure, using a maximum flask temperature of 90° C. to yield 1245 parts of water-white resinous solid.

In Examples 17 to 21 inclusive, the ammonia derivative can be replaced by other materials which have a >NH group with the free valences being filled by hydrogen or carbon atoms. This therefore includes amides and primary and secondary amines such as the ureas, thioureas, melamines, sulfonamides, and alkyl-substituted derivatives thereof. It is only necessary that the material be capable of condensing with an aldehyde.

The second class of condensates suitable for modifying the compositions herein described are those which contain reactive phenolic hydroxyl groups formed by the reaction of phenols and aldehydes. Phenol and formaldehyde react to form a variety of reaction products depending upon the proportions and conditions of reaction. These include products such as phenol alcohols having both phenolic and alcoholic hydroxyl groups, and products of the diphenolmethane type containing phenolic hydroxyl groups only. The condensation of phenol and formaldehyde can be carried out with the use of acid or alkaline condensing agents and in some cases by first combining the aldehyde with an alkali such as ammonia to form hexamethylenetetramine and reacting the latter with the phenol. The phenol-aldehyde resins at an initial or intermediate stage of reaction are intended to be included in the term phenol-aldehyde condensates as used herein.

In general, the phenol-aldehyde condensates should not have their condensation carried so far as to become insoluble and nonreactive. It is preferred in the preparation of the instant compositions that they be used at an intermediate stage or at a stage of reaction such that they contain reactive phenolic hydroxyl groups or both phenolic and alcoholic hydroxyl groups. This is desirable in order to permit a proper blending of the phenol-aldehyde condensate with the polyepoxides and diphenol carboxylic acid ester for subsequent reaction therewith.

The phenol-aldehyde condensates may be derived from mononuclear phenols, polynuclear phenols, monohydric phenols, or polyhydric phenols. The critical requirement for the condensate is that it be compatible with the polyepoxides and diphenol carboxylic acid esters or with the two reactants in a solvent used as a reaction medium. The phenol-aldehyde condensate which is essentially a polymethylol phenol rather than a polymer may be used in the preparation of the new phenol-aldehyde, polyepoxide, diphenol carboxylic acid ester products, or it may be used after further condensation, in which case some of the methylol groups are usually considered to have disappeared in the process of condensation. Various so-called phenolic resins which result from the reaction of phenols and aldehydes, and particularly from common phenols or cresols and formaldehyde, are available as commercial products both of an initial and intermediate character. Such products include resins which are readily soluble in common solvents or readily fusible so that they can be admixed with the epoxide and diphenol carboxylic acid esters and reacted therewith to form the products of this invention.

In selecting a phenol-aldehyde condensate one may choose either the heat-converting or the permanently fusible type. For example, the formaldehyde reaction products of such phenols as carbolic acid, resorcinol, and 2,2-bis(4-hydroxyphenyl)propane readily convert to infusible, insoluble compositions on the application of heat. On the other hand, some of the para alkylated phenols, as illustrated by p-tert-butylphenol, produce permanently fusible resins on reaction with formaldehyde. Even though fusible condensates are employed, however, insoluble, infusible products result when they are heated in combination with the epoxides and the diphenol carboxylic acid esters described.

Examples 22 to 24, inclusive, describe the preparation of some of the operable phenol-aldehyde condensates which may be used in combination with the polyepoxides and diphenolic acid esters to form the products herein described. It is to be noted that the three examples are drawn from distinct classes of phenols and are meant to be representative of the broad class of phenols. Thus, in Example 22, the phenol is a dihydroxy dinuclear phenol, in Example 23 an alkyl-substituted phenol, and in Example 24 a simple phenol. The examples, therefore, illustrate the unsubstituted monohydric phenols, the substituted monohydric phenols, and the polynuclear phenols.

*Example 22*

In a 3-liter 3-neck flask provided with a mechanical agitator, a thermometer, and a reflux condenser was placed 912 parts of Bisphenol A, 960 parts of 37% aqueous formaldehyde, and 2.3 parts of oxalic acid. With continuous agitation, the reaction mixture was heated to the reflux temperature and refluxing continued for a period of 1 hour. After permitting the reaction mixture to cool to around 50° C. the water layer was removed by decantation. The phenol-formaldehyde layer was then washed three times with water which in each case was removed by decantation. The last portion of water was removed by distillation at reduced pressure using a water aspirator system which gave pressure around 30–40 mm. The temperature during the removal of this last portion of water ranged from 70–90° C. The product, amounting to 1065 parts, was a clear, heavy, syrupy material.

*Example 23*

The procedure of preparation, including the dehydration step, was the same as that used in Example 22. A mixture of 1000 parts of p-tert-butylphenol, 1067 parts of 37% aqueous formaldehyde, and 10 parts of sodium hydroxide was used to give a final yield of 1470 parts of a clear, almost colorless syrupy product.

*Example 24*

Again a reaction procedure including the dehydration step, was the same as that used in Example 22. A mixture of 658 parts of phenol, 1400 parts of 37% aqueous formaldehyde, and 6.6 parts of sodium hydroxide was used to give a final yield of 1168 parts of a clear, syrupy product.

In Examples 17 and 24 inclusive, the aldehyde can be replaced by other mono-aldehydes including acetaldehyde, propionaldehyde, n,butyraldehyde, isobutyraldehyde, valeraldehyde, capronaldehyde, heptaldehyde as well as the more complex aldehydes such as furfural.

In Examples 22 to 24 inclusive, the phenol can be replaced by other phenols including ortho, meta, and para cresol, 2,4 xylenol, 3,4 xylenol, 2,5 xylenol, 3,5 xylenol, 2,5 dibutyl phenol, p-phenyl phenol, 2 ethyl-phenol p-cyclohexylphenol, 3 isopropyl phenol and p-tert-amylphenol.

GENERAL REACTION CONDITIONS AND CHARACTERISTICS OF THE NEW COMPOSITIONS

In making the new compositions, the polyepoxides and diphenol carboxylic acid esters or such compositions modified with aldehyde condensates are admixed in suitable proportions and reaction will proceed merely by the application of heat. More specifically the reaction is effected by heating the mixtures at elevated temperatures, usually in the range of about 75–250° C. Catalysts are unnecessary, but in certain cases it may be desirable to speed up the reaction by the use of catalysts, such as boron trifluoride adducts, sodium phenoxides, and mineral acid type catalysts.

The reaction mixtures and final reaction products of this invention can be prepared by using varying ratios of epoxide to diphenol carboxylic acid esters. The quantities of reactants employed in a given instance will depend upon the characteristics desired in the final product. Flexible or rigid materials can be obtained from the proper selection of epoxide, diphenol carboxylic acid ester and phenolaldehyde condensate. In general, operable products are those in which the ratio of epoxide to diphenol carboxylic acid ester, on an equivalent weight basis, ranges from about 6:1 to 1:6 with the preferred range, because of the general over-all characteristics, being from 2:1 to 1:2. In instances where an aldehyde condensate is used as a modifier, operable amounts on a weight basis of the combined epoxide and diphenolic acid range up to about 90%, but from a practical standpoint, the preferred percentage is about 10% to 35%. Equivalent weight as used above refers to the weight of polyepoxide per epoxide group, in the case of the polyepoxide, and the weight of the diphenol carboxylic acid ester per phenolic hydroxyl group, in the case of the ester.

Compositions containing the polyepoxides and the diphenol carboxylic acid esters or such compositions modified with aldehyde condensates can be used as admixtures or at varying intermediate stages of reaction. The initial admixtures or intermediate reaction products which are soluble in common organic solvents may be blended in solution in proper proportions and the solutions then applied as an impregnant for fabrics or paper, or for the formation of protective coating films. Subsequent heating functions to remove the solvent and bring about polymerization to the insoluble, infusible state. For other uses, the initial or intermediate mixture may be used without a solvent, giving directly a composition which, on the application of heat, converts to an infusible, insoluble final product.

In making the new compositions and products herein described, the polyepoxides and the diphenol carboxylic acid ester or such compositions modified with aldehyde condensates are usually used in regulated proportions without the addition of other materials. However, for certain uses, other components are often advantageously added, including filling and compounding materials, plasticizers, pigments, etc. The compositions which tend to give somewhat brittle products on conversion to the insoluble, infusible state can be advantageously compounded with plasticizers, although for most applications, it is possible to obtain suitable flexibility and toughness by regulating the proportions and types of reacting ingredients, thereby obviating the need for plasticizers.

The application of heat to the mixtures herein set forth involves several chemical reactions. It will be appreciated that the reactions involved are complex and the extent to which each takes place will vary with the temperature used in heat treating, the period of time therefor, and with the particular types of polyepoxides, aldehyde condensate, if used, and diphenol carboxylic acid ester chosen. While it is not desired to be limited by any theoretical explanation of the exact nature of these reactions, it seems probable that conversion to the final polymeric products is accompanied by direct polymerization of the epoxide groups inter se; reaction of the epoxide groups with methylol hydroxyl groups; reaction of the epoxide groups with phenolic hydroxyl groups, and reaction of epoxide groups with active hydrogen attached to a nitrogen atom, all of which take place to some extent simultaneously in forming the final products.

The present invention provides a wide range of reaction compositions and products including initial mixtures of the polyepoxides, aldehyde condensates, and the diphenol carboxylic acid esters, partial or intermediate reaction products of such mixtures and compositions containing such intermediate reaction products as well as final reaction products. In general, the initial mixtures, as well as the intermediate reaction products unless too highly polymerized, are soluble in solvents of the lacquer type, such as ketone or ester solvents.

In addition to having outstanding physical properties, such as hardness, toughness and flexibility, the final infusible, insoluble products have outstanding chemical properties, such as high resistance to oxidation, water, alkali, acids and organic solvents. It has also been observed that the final conversion products possess unusually good adhesion to most surfaces including metal, glass, wood and plastics. This property of outstanding adhesion to a wide variety of surfaces gives the subject products high potential value for use in formulating adhesives. This property is also of extreme value in formulating protective coating films for use on many types of surfaces. The adhesion characteristics are probably due to the fact that even in the converted, infusible state, the compositions contain a relatively high percentage of highly polar groups, such as ether groups, ester groups, and alcoholic and phenolic hydroxyl groups. Despite the high percentage of polar groups in the insoluble, infusible products of this invention the tolerance for water is unusually low, apparently due to the high molecular weight and rigid cross-linked structure of the final compositions.

Prior Greenlee applications, Serial Nos. 541,022, 557,835 and 562,663 filed on October 17, 1955, January 9, 1956, and February 1, 1956, respectively, relate to conversion products obtained from polyepoxides and diphenol carboxylic acids. The conversion products of this invention are to be distinguished therefrom in that here, the esterification of the carboxyl group removes one functional group from the reaction mixture. Thus, the compositions of this invention are characterized by a lower degree of cross-linking with the epoxide groups and alcoholic hydroxyl groups found in the polyepoxide. This diminished cross-linking is a factor which contributes to a relatively greater degree of flexibility or a lower degree of hardness in the products of this invention, as compared to those described in the above applications. An additional factor contributing to this property is the presence of the carbon atoms contributed by the alcohols used to make the ester. Although effective plasticization is effected only by the reactively high molecular weight alcohol residues, even the lower alcohols, such as methyl or ethyl have an effect on the hardness of the final conversion products. Because of the removal of the carboxyl group by esterification, the reaction mixtures herein described are also characterized by greater hydrophobicity, rendering them more compatible with organic materials with which it may be desired to compound them.

EXPERIMENTAL

Examples 25 to 155, inclusive, illustrate the preparation of insoluble, infusible protective coating films from the compositions of this invention. In the preparation of the compositions for heat curing to form the protective coating films, each of the diphenol carboxylic acid esters and the polyepoxides with the exception of epoxidized polyesters were dissolved in methyl ethyl ketone to a non-volatile content of 40-60%. In certain instances it may be desirable to use a small amount of dioxane or similar solvent to help effect the solubilization of the diphenol carboxylic acid esters. The epoxidized polyesters were used at the non-volatile and in the solvent in which they were prepared. The aldehyde condensates were dissolved in a mixture of methyl ethyl ketone and butanol to a non-volatile content of 40-60%. Mixtures of the diphenol carboxylic acid esters and polyepoxides or such compositions modified with aldehyde condensates were found to be stable up to six weeks or more at room temperature. Mixtures of the solutions were spread on panels with a .002″ Bird applicator and the films were baked for periods of 30 to 90 minutes at temperatures ranging from 150-200° C. Proportions as used in the following table refer to parts by weight and are based on the non-volatile content of the solutions of reactants.

| Example | Parts of polyepoxide | Parts of DPA ester | Parts of aldehyde condensate | Baking schedule, min./T.° C. | Film resistance | |
|---|---|---|---|---|---|---|
| | | | | | Boiling water | 5% aqueous NaOH at 25° C. |
| 25 | 16.2 Epon 1001 | 5.0 Ex. 1 | | 30/200 | 20 min. | 144 hr. |
| 26 | 9.1 Epon 1001 | 5.0 Ex. 3 | | 30/200 | 20 min. | 144 hr. |
| 27 | do | 5.0 Ex. 4 | | 30/200 | 20 min. | 176 hr. |
| 28 | 9.0 Epon 1001 | 5.0 Ex. 5 | | 45/200 | 1 hr. | 168 hr. |
| 29 | 12.1 Epon 1001 | 5.0 Ex. 6 | | 45/200 | 30 min. | 168 hr. |
| 30 | 14.9 Epon 1001 | 5.0 Ex. 2 | | 45/200 | 2 hr. | 168 hr. |
| 31 | 29.8 Epon 1001 | 5.0 Ex. 1 | | 30/200 | 15 min. | 144 hr. |
| 32 | 16.6 Epon 1004 | 5.0 Ex. 5 | | 45/200 | 15 min. | 80 hr. |
| 33 | 22.5 Epon 1004 | 5.0 Ex. 6 | | 45/200 | 15 min. | 80 hr. |
| 34 | 27.4 Epon 1004 | 5.0 Ex. 2 | | 45/200 | 15 min. | 120 hr. |
| 35 | 59.2 Epon 1007 | 5.0 Ex. 1 | | 30/200 | 15 min. | 96 hr. |
| 36 | 33.1 Epon 1007 | 5.0 Ex. 3 | | 30/200 | 15 min. | 72 hr. |
| 37 | do | 5.0 Ex. 4 | | 30/200 | 15 min. | 176 hr. |
| 38 | 44.6 Epon 1007 | 5.0 Ex. 6 | | 45/200 | 15 min. | 24 hr. |
| 39 | 54.5 Epon 1007 | 5.0 Ex. 2 | | 45/200 | 15 min. | 80 hr. |
| 40 | 8.5 Epon 1007 | 1.5 Ex. 1 | | 30/200 | 30 min. | 24 hr. |
| 41 | 6.3 Epon 864 | 5.0 Ex. 5 | | 45/200 | 15 min. | 168 hr. |
| 42 | 8.5 Epon 864 | 5.0 Ex. 6 | | 45/200 | 15 min. | 80 hr. |
| 43 | 10.4 Epon 864 | 5.0 Ex. 2 | | 45/200 | 15 min. | 168 hr. |
| 44 | 1.5 Epon 864 | 8.5 Ex. 4 | | 30/200 | 4 hr. | 4 hr. |
| 45 | 5.0 Ex. 11 | 3.6 Ex. 3 | | 30/200 | 7 hr. | 15 min. |
| 46 | 5.0 Ex. 11 | 3.6 Ex. 4 | | 30/200 | 7 hr. | 15 min. |
| 47[1] | 8.9 Ex. 12 | 5.0 Ex. 2 | | 30/175 | 2 hr. | 45 min. |
| 48[1] | 5.4 Ex. 12 | 5.0 Ex. 5 | | 30/175 | 15 min. | 30 min. |
| 49[1] | 7.3 Ex. 12 | 5.0 Ex. 6 | | 30/175 | 5 hr. 40 min. | 20 min. |
| 50[1] | 2.0 Ex. 11 | 5.0 Ex. 1 | | 30/175 | 8 hr. | 6 hr. 30 min. |
| 51[1] | 9.6 Ex. 10 | 5.0 Ex. 1 | | 30/175 | 20 min. | 30 min. |
| 52[1] | 5.4 Ex. 10 | 5.0 Ex. 3 | | 30/175 | 15 min. | 15 min. |
| 53[1] | 7.3 Ex. 10 | 5.0 Ex. 6 | | 30/175 | 2 hr. 30 min. | 30 min. |
| 54[1] | 8.8 Ex. 10 | 5.0 Ex. 2 | | 30/175 | 2 hr. 40 min. | 15 min. |
| 55[1] | 9.0 Ex. 11 | 1.0 Ex. 1 | | 30/200 | 30 min. | 30 min. |
| 56[1] | 10.2 Ex. 13 | 5.0 Ex. 6 | | 45/200 | 2 hr. 40 min. | 30 min. |
| 57[1] | 9.2 Ex. 13 | 5.0 Ex. 5 | | 45/200 | 1 hr. 30 min. | 30 min. |
| 58[1] | 15.3 Ex. 13 | 5.0 Ex. 2 | | 45/200 | 2 hr. | 1 hr. 15 min. |
| 59[1] | 16.6 Ex. 13 | 5.0 Ex. 1 | | 45/175 | 2 hr. 30 min. | 30 min. |
| 60[1] | 9.2 Ex. 13 | 5.0 Ex. 3 | | 45/175 | 1 hr. 15 min. | 2 hr. |
| 61[1] | 9.2 Ex. 13 | 5.0 Ex. 4 | | 45/175 | 1 hr. 15 min. | 1 hr. 30 min. |
| 62[1] | 4.9 Ex. 14 | 5.0 Ex. 4 | | 30/200 | 7 hr. | 30 min. |
| 63[1] | 4.9 Ex. 14 | 5.0 Ex. 3 | | 30/200 | 3 hr. | 30 min. |
| 64 | 10.1 Ex. 15 | 10.0 Ex. 1 | | 30/200 | 15 min. | 45 min. |
| 65 | 5.7 Ex. 15 | 10.0 Ex. 3 | | 30/200 | 7 hr. | 45 min. |
| 66 | 5.7 Ex. 15 | 10.0 Ex. 4 | | 30/200 | 7 hr. | 3 hr. |
| 67 | 6.6 Ex. 16 | 5.0 Ex. 1 | | 30/200 | 3 hr. 30 min. | 30 min. |
| 68 | 3.7 Ex. 16 | 5.0 Ex. 3 | | 30/200 | 7 hr. | 4 hr. |
| 69 | 3.7 Ex. 16 | 5.0 Ex. 4 | | 30/200 | 7 hr. | 4 hr. |
| 70 | 5.6 Ex. 15 | 10.0 Ex. 5 | | 45/200 | 45 min. | 24 hr. |
| 71 | 7.6 Ex. 15 | 10.0 Ex. 6 | | 45/200 | 15 min. | 20 min. |
| 72 | 9.3 Ex. 15 | 10.0 Ex. 2 | | 45/200 | 16 hr. | 20 min. |
| 73 | 3.7 Ex. 16 | 5.0 Ex. 5 | | 45/200 | 4 hr. 30 min. | 3 hr. |
| 74 | 5.0 Ex. 16 | 5.0 Ex. 6 | | 30/200 | 2 hr. 20 min. | 30 min. |
| 75 | 6.1 Ex. 16 | 5.0 Ex. 2 | | 45/200 | 2 hr. 20 min. | 30 min. |

| Example | Parts of polyepoxide | Parts of DPA ester | Parts of aldehyde condensate | Baking schedule, min./T.°C. | Film resistance Boiling water | Film resistance 5% aqueous NaOH at 25°C. |
|---|---|---|---|---|---|---|
| 76 | 9.0 Ex. 16 | 1.0 Ex. 2 | | 30/200 | 8 hr | 2 hr. |
| 77[1] | 1.0 Epon 1001 | 0.5 Ex. 7 | | 30/200 | 16+ hrs | 50+ hr. |
| 78[1] | 0.75 Epon 1004 | 1.0 Ex. 9 | | 30/200 | 16+ hr | 50+ hr. |
| 79[1] | 1.5 Epon 562 | 0.5 Ex. 8 | | 30/200 | 30 min | 3 hr. |
| 80[1] | 1.0 Epon 1004 | 1.0 Ex. 7 | 1.0 Ex. 24 | 30/200 | 16+ hr | 50+ hr. |
| 81[1] | 0.5 Epon 562 | 1.0 Ex. 9 | 1.0 Ex. 22 | 30/200 | 1 hr | 26 hr. |
| 82[1] | 1.5 Epon 1001 | 1.0 Ex. 8 | 0.5 Ex. 23 | 30/200 | 16+ hr | 50+ hr. |
| 83[1] | 2.0 Epon 1004 | 1.0 Ex. 8 | 1.0 Ex. 17 | 30/200 | 16+ hr | 50+ hr. |
| 84[1] | 0.5 Epon 1001 | 0.5 Ex. 9 | 2.0 Ex. 18 | 30/200 | 15 min | 30 min. |
| 85[1] | 1.5 Epon 562 | 1.0 Ex. 7 | .75 Ex. 21 | 30/200 | 2 hr. 30 min | 8 hr. |
| 86 | 16.2 Epon 1001 | 5.0 Ex. 1 | 2.1 Ex. 23 | 30/175 | 6 hr. 30 min | 144 hr. |
| 87 | 6.3 Epon 864 | 5.0 Ex. 4 | 1.1 Ex. 23 | 30/175 | 10 min | 144 hr. |
| 88 | 16.6 Epon 1004 | 5.0 Ex. 3 | 2.2 Ex. 22 | 105/175 | 30 min | 144 hr. |
| 89 | 33.1 Epon 1007 | 5.0 Ex. 4 | 3.8 Ex. 22 | 105/175 | 15 min | 144 hr. |
| 90 | 16.6 Epon 1004 | 5.0 Ex. 4 | 2.2 Ex. 24 | 45/175 | 15 min | 30 hr. |
| 91 | 59.2 Epon 1007 | 5.0 Ex. 1 | 6.4 Ex. 24 | 45/175 | 15 min | 144 hr. |
| 92 | 9.0 Epon 1001 | 5.0 Ex. 5 | 1.4 Ex. 23 | 30/175 | 1 hr. 20 min | 168 hr. |
| 93 | 54.5 Epon 1007 | 5.0 Ex. 2 | 6.0 Ex. 23 | 30/175 | 22 min | 168 hr. |
| 94 | 22.5 Epon 1004 | 5.0 Ex. 6 | 2.8 Ex. 22 | 60/175 | 22 min | 72 hr. |
| 95 | 27.4 Epon 1004 | 5.0 Ex. 2 | 3.2 Ex. 24 | 60/175 | 6 hr | 8 hr. |
| 96 | 1.0 Epon 864 | 8.0 Ex. 4 | 1.0 Ex. 23 | 30/200 | 8 hr | 6 hr. 30 min. |
| 97 | 2.5 Epon 1001 | 2.5 Ex. 6 | 5.0 Ex. 22 | 30/200 | 8 hr | 24 hr. |
| 98 | 1.0 Epon 1001 | 0.5 Ex. 3 | 8.5 Ex. 22 | 30/200 | 8 hr | 6 hr. 30 min. |
| 99 | 5.7 Ex. 15 | 10.0 Ex. 4 | 2.0 Ex. 23 | 30/175 | 10 min | 45 min. |
| 100 | 6.6 Ex. 16 | 5.0 Ex. 1 | 1.2 Ex. 22 | 45/175 | 6 hr. 30 min | 30 min. |
| 101 | 3.7 Ex. 16 | 5.0 Ex. 3 | 1.7 Ex. 24 | 30/175 | 6 hr. 30 min | 1 hr. 30 min. |
| 102 | 5.7 Ex. 15 | 10.0 Ex. 5 | 1.6 Ex. 22 | 60/175 | 8 hr | 24 hr. |
| 103 | 7.6 Ex. 15 | 10.0 Ex. 6 | 1.8 Ex. 24 | 90/175–200 | 8 hr | 7 hr. 30 min. |
| 104 | 6.1 Ex. 16 | 5.0 Ex. 2 | 1.1 Ex. 22 | 30/175 | 42 min | 20 min. |
| 105 | 8.0 Ex. 16 | 1.0 Ex. 4 | 1.0 Ex. 24 | 30/200 | 2 hr | 3 hr. |
| 106 | 2.5 Ex. 16 | 2.5 Ex. 5 | 5.0 Ex. 22 | 30/200 | 8 hr | 6 hr. 30 min. |
| 107 | 5.0 Ex. 10 | 5.3 Ex. 3 | 2.1 Ex. 22 | 40/200 | 6 hr | 10 min. |
| 108 | 6.9 Ex. 11 | 5.0 Ex. 4 | 2.3 Ex. 23 | 40/200 | 1 hr. 5 min | 68 hr. |
| 109 | 8.9 Ex. 12 | 5.0 Ex. 2 | 1.4 Ex. 23 | 40/200 | 45 min | 72 hr. |
| 110[1] | 9.6 Ex. 10 | 5.0 Ex. 1 | 1.5 Ex. 23 | 30/200 | 1 hr. 15 min | 4 hr. |
| 111[1] | 5.4 Ex. 10 | 5.0 Ex. 3 | 1.0 Ex. 24 | 30/200 | 1 hr. 30 min | 15 min. |
| 112[1] | 7.3 Ex. 10 | 5.0 Ex. 6 | 1.2 Ex. 22 | 30/200 | 3 hr | 1 hr. 35 min. |
| 113[1] | 8.8 Ex. 10 | 5.0 Ex. 2 | 1.4 Ex. 23 | 30/200 | 1 hr. 15 min | 4 hr. |
| 114 | 1.0 Ex. 11 | 0.5 Ex. 2 | 8.5 Ex. 22 | 30/200 | 3 hr | 2 hr. |
| 115 | 8.5 Ex. 11 | 1.0 Ex. 1 | 0.5 Ex. 23 | 30/200 | 30 min | 30 min. |
| 116 | 9.2 Ex. 13 | 5.0 Ex. 5 | 1.5 Ex. 23 | 45/200 | 12 min | 15 min. |
| 117 | 9.1 Epon 1001 | 5.0 Ex. 3 | 1.4 Ex. 19 | 30/175 | 6 hr. 30 min | 144 hr. |
| 118 | 6.3 Epon 864 | 5.0 Ex. 3 | 2.3 Ex. 19 | 30/175 | 8 hr | 96 hr. |
| 119 | 9.1 Epon 1001 | 5.0 Ex. 4 | 1.4 Ex. 18 | 30/175 | 8 hr | 24 hr. |
| 120 | 11.3 Epon 864 | 5.0 Ex. 1 | 1.6 Ex. 18 | 30/175 | 8 hr | 144 hr. |
| 121 | 29.8 Epon 1004 | 5.0 Ex. 1 | 3.5 Ex. 17 | 30/175 | 30 min | 72 hr. |
| 122 | 33.1 Epon 1007 | 5.0 Ex. 3 | 3.8 Ex. 17 | 30/175 | 30 min | 144 hr. |
| 123 | 12.1 Epon 1001 | 5.0 Ex. 6 | 1.7 Ex. 19 | 60/175 | 8 hr | 72 hr. |
| 124 | 8.5 Epon 864 | 5.0 Ex. 6 | 1.4 Ex. 19 | 60/175 | 8 hr | 72 hr. |
| 125 | 14.9 Epon 1001 | 5.0 Ex. 2 | 2.0 Ex. 18 | 30/175 | 8 hr | 72 hr. |
| 126 | 6.3 Epon 864 | 5.0 Ex. 5 | 1.1 Ex. 18 | 60/175 | 8 hr | 72 hr. |
| 127 | 16.6 Epon 1004 | 5.0 Ex. 5 | 2.2 Ex. 17 | 30/175 | 22 min | 72 hr. |
| 128 | 10.4 Epon 864 | 5.0 Ex. 2 | 1.5 Ex. 17 | 30/175 | 22 min | 24 hr. |
| 129 | 33.0 Epon 1007 | 5.0 Ex. 5 | 3.8 Ex. 21 | 60/175 | 10 min | 168 hr. |
| 130 | 44.6 Epon 1007 | 5.0 Ex. 6 | 5.0 Ex. 20 | 30/175 | 3 hr | 168 hr. |
| 131 | 1.0 Epon 1001 | 1.0 Ex. 3 | 8.0 Ex. 19 | 30/200 | 8 hr | 3 hr. |
| 132[1] | 5.4 Ex. 10 | 5.0 Ex. 4 | 1.0 Ex. 17 | 30/200 | 45 min | 116 hr. |
| 133[1] | 11.1 Ex. 11 | 5.0 Ex. 1 | 1.6 Ex. 19 | 30/200 | 1 hr. 30 min | 50 hr. |
| 134[1] | 5.4 Ex. 10 | 5.0 Ex. 5 | 1.0 Ex. 18 | 30/200 | 40 min | 50 hr. |
| 135[1] | 10.8 Ex. 12 | 10.0 Ex. 5 | 2.1 Ex. 18 | 30/200 | 1 hr. 15 min | 28 hr. |
| 136 | 10.6 Ex. 12 | 5.0 Ex. 2 | 1.6 Ex. 19 | 30/200 | 2 hr | 168 hr. |
| 137[1] | 7.3 Ex. 12 | 5.0 Ex. 6 | 1.2 Ex. 17 | 30/200 | 10 min | 50 hr. |
| 138 | 4.7 Ex. 10 | 5.0 Ex. 5 | 1.9 Ex. 17 | 90/175–200 | 8 hr | 5 hr. |
| 139 | 5.0 Ex. 11 | 3.6 Ex. 3 | .9 Ex. 21 | 30/175 | 10 hr | 10 min. |
| 140 | 5.0 Ex. 11 | 3.6 Ex. 4 | .9 Ex. 20 | 30/175 | 10 hr | 10 min. |
| 141 | 8.0 Ex. 11 | 1.0 Ex. 4 | 1.0 Ex. 18 | 30/200 | 8 hr | 30 min. |
| 142 | 1.0 Ex. 11 | 8.0 Ex. 3 | 1.0 Ex. 19 | 30/200 | 8 hr | 2 hr. |
| 143 | 2.5 Ex. 11 | 2.5 Ex. 5 | 5.0 Ex. 19 | 30/200 | 8 hr | 6 hr. 30 min. |
| 144 | 10.1 Ex. 15 | 10.0 Ex. 1 | 2.0 Ex. 19 | 30/175 | 6 hr. 30 min | 45 min. |
| 145 | 5.7 Ex. 15 | 10.0 Ex. 4 | 1.6 Ex. 17 | 30/175 | 8 hr | 3 hr. |
| 146 | 3.7 Ex. 16 | 5.0 Ex. 4 | 1.7 Ex. 18 | 30/175 | 6 hr. 30 min | 30 min. |
| 147 | 3.7 Ex. 16 | 5.0 Ex. 5 | .9 Ex. 18 | 30/175 | 1 hr | 10 min. |
| 148 | 5.0 Ex. 16 | 5.0 Ex. 6 | 1.0 Ex. 17 | 30/175 | 2 hr. 45 min | 20 min. |
| 149 | 9.3 Ex. 15 | 10.0 Ex. 2 | 1.9 Ex. 21 | 45/175 | 6 hr | 3 hr. |
| 150 | 6.1 Ex. 16 | 5.0 Ex. 2 | 1.1 Ex. 20 | 30/175 | 32 min | 4 hr. |
| 151 | 5.7 Ex. 15 | 10.0 Ex. 3 | 1.6 Ex. 19 | 30/200 | 8 hr | 3 hr. |
| 152 | 8.0 Ex. 16 | 1.0 Ex. 1 | 1.0 Ex. 18 | 30/200 | 8 hr | 24 hr. |
| 153 | 1.0 Ex. 15 | 8.0 Ex. 4 | 1.0 Ex. 19 | 30/200 | 8 hr | 6 hr. 30 min. |
| 154 | 10.2 Ex. 13 | 5.0 Ex. 6 | 2.5 Ex. 19 | 60/175 | 1 hr | 2 hr. 30 min. |
| 155 | 15.3 Ex. 13 | 5.0 Ex. 2 | 4.0 Ex. 18 | 30/175 | 30 min | 20 min. |

[1] Contains .02 part NaOEt catalyst.

*Example 156*

25 parts Epon 1001, 25 parts Example 4, and 50 parts Example 18 were charged to a reaction vessel and heat converted 30 minutes at 200° C. to give a hard, tough, infusible and insoluble product.

*Example 157*

10 parts Example 10, 10 parts Example 2 and 80 parts Example 19 were charged to a reaction vessel and heat converted 30 minutes at 200° C. to give a hard, tough, infusible and insoluble product.

*Example 158*

10 parts Example 15, 10 parts Example 6 and 80 parts Example 19 were charged to a reaction vessel and heat converted 30 minutes at 200° C. to give a hard, tough, infusible and insoluble product.

*Example 159*

25 parts Example 15, 25 parts Example 3 and 50 parts Example 19 were charged to a reaction vessel and heat converted 30 minutes at 200° C. to give a hard, tough, infusible and insoluble product.

Example 160

88 parts Example 14, 50 parts Example 1 and 12 parts Example 18 were charged to a reaction vessel and heat converted for 30 minutes at 200° C. to form a tough, hard, infusible and insoluble product.

Example 161

10 parts of Example 15, 80 parts of Example 6 and 10 parts of Example 24 were charged to a reaction vessel and heat converted 30 minutes at 200° C. to give a hard, tough, infusible and insoluble product.

Example 162

10 parts of Example 16, 10 parts Example 3 and 80 parts Example 24 were charged to a reaction vessel and heat converted 30 minutes at 200° C. to give a hard, tough, infusible and insoluble product.

Example 163

25 parts of Example 11, 25 parts of Example 2 and 50 parts of Example 23 were charged to a reaction vessel and heat converted 30 minutes at 200° C. to give a hard, tough, infusible and insoluble product.

Example 164

49 parts of Example 14, 50 parts of Example 4 and 30 parts of Example 22 were charged to a reaction vessel and heat converted 30 minutes at 200° C. to give a hard, tough, infusible and insoluble product.

It should be appreciated that the invention is not to be construed to be limited by the illustrated examples. It is possible to produce still other embodiments without departing from the inventive concept herein disclosed. This application is a continuation-in-part of the Greenlee copending applications S.N. 597,360, 609,553, and 610,384, filed July 12, 1956, September 13, 1956, and September 17, 1956, respectively, now abandoned.

It is claimed and desired to secure by Letters Patent:

1. A composition of matter comprising the condensation product obtained by heating (A) an organic polyepoxide having an average of more than one epoxide group per molecule wherein the epoxy oxygen atom is linked to adjacent carbon atoms and (B) the 4,4 bis(hydroxyaryl) pentanoic acid ester of an aliphatic monohydric alcohol wherein the hydroxyaryl radical is a member of the group consisting of unsubstituted hydroxyphenyl and ring substituted hydroxyphenyl wherein the hydroxy group of said member is in a position other than one meta to the point of attachment of said member to the pentanoic acid, any substituents on the hydroxyphenyl being a member selected from the group consisting of chloro, bromo, nitro and alkyl groups of from 1–5 carbon atoms, and wherein the reactive oxirane groups of (A) and the reactive hydrogens of (B) are present in an equivalent ratio of from 6:1 to 1:6.

2. The composition of claim 1 wherein the reactive oxirane groups of (A) and the reactive hydrogens of (B) are present in an equivalent ratio of from about 2:1 to 1:2.

3. A composition of matter comprising the condensation product obtained by heating (A) an organic polyepoxide having an average of more than one epoxide group per molecule wherein the epoxy oxygen atom is linked to adjacent carbon atoms, (B) the 4,4 bis(hydroxyaryl)pentanoic acid ester of an aliphatic monohydric wherein the hydroxyaryl radical is a member of the group consisting of unsubstituted hydroxyphenyl and ring substituted hydroxyphenyl wherein the hydroxy group of said member is in a position other than one meta to the point of attachment of said member to the pentanoic acid, any substituents on the hydroxyphenyl being a member selected from the group consisting of chloro, bromo, nitro and alkyl groups of from 1–5 carbon atoms, and wherein the reactive oxirane groups of (A) and the reactive hydrogens of (B) are present in an equivalent ratio of from about 6:1 to 1:6, and (C) from 10–35% by weight of a fusible condensate of a monoaldehyde with at least one organic ammonia derivative selected from the group consisting of urea, thiourea, melamine, toluenesulfonamide and alkyl substituted derivatives thereof.

4. A composition of matter comprising the condensation product obtained by heating (A) an organic polyepoxide having an average of more than one epoxide group per molecule wherein the epoxy oxygen atom is linked to adjacent carbon atoms, (B) the 4,4 bis(hydroxyaryl)pentanoic acid ester of an aliphatic monohydric alcohol wherein the hydroxyaryl radical is a member of the group consisting of unsubstituted hydroxyphenyl and ring substituted hydroxyphenyl wherein the hydroxy group of said member is in a position other than one meta to the point of attachment of said member to the pentanoic acid, any substituents on the hydroxyphenyl being a member selected from the group consisting of chloro, bromo, nitro and alkyl groups of from 1–5 carbon atoms, and wherein the reactive oxirane groups of (A) and the reactive hydrogens of (B) are present in an equivalent ratio of from about 6:1 to 1:6, and (C) from 10–35% by weight of a fusible condensate of a monoaldehyde with a phenol.

5. The composition of claim 2 wherein the pentanoic acid is 4,4-bis(4-hydroxyphenyl) pentanoic acid.

6. The composition of claim 2 wherein the hydroxyaryl radical of the pentanoic acid is alkyl substituted.

7. The composition of claim 2 wherein the monohydric alcohol contains only carbon, hydrogen and oxygen and is free of reactive groups other than hydroxyl.

8. The composition of claim 2 wherein said polyepoxide (A) is a complex epoxide which is a polymeric polyhydric alcohol having alternating aliphatic chains and aromatic nuclei united through ether oxygen and terminating in oxirane substituted aliphatic chains.

9. The composition of matter of claim 2 wherein said polyepoxide (A) is an epoxidized polyester of tetrahydrophthalic acid and a glycol, wherein the epoxy oxygen atoms are each linked to adjacent carbon atoms in the nucleus of said acid.

10. The composition of matter of claim 2 wherein said polyepoxide (A) is an epoxidized ester of an unsaturated natural fatty oil acid containing about 15–22 carbon atoms, and having its reactive groups selected from the class consisting of oxirane and hydroxy.

11. The composition of matter of claim 2 wherein said polyepoxide (A) is an aliphatic polyepoxide selected from the group consisting of bis(glycidyloxy) butene, triglycidyl glyceryl ether, diepoxy butane, and diglycide ether.

References Cited in the file of this patent

UNITED STATES PATENTS 2,592,560    Greenlee _____ Apr. 15, 1952

OTHER REFERENCES

Bader et al.: J.A.C.S., vol. 76, pp. 4465–4466 (Sept. 5, 1954). (Copy in Scientific Library.)

UNITED STATES PATENT OFFICE
Certificate of Correction

Patent No. 2,907,731                                                                    October 6, 1959

Sylvan Owen Greenlee

It is hereby certified that error appears in the printed specification of the above numbered patent requiring correction and that the said Letters Patent should read as corrected below.

Column 1, line 22, for "expoxides" read —epoxides—; column 6, line 18, for "linsed" read —linseed—; lines 36 and 43, for "4,4-bis(4-hydroxyphenol) pentanoic acid", each occurrence, read —4,4-bis(4-hydroxyphenyl)pentanoic acid—; column 9, line 64, for "consist" read —consists—; column 10, lines 24 to 30, the right-hand portion of the equation should appear as shown below instead of as in the patent:

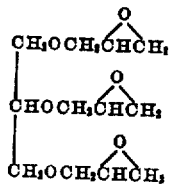

column 11, line 54, for "RR'$_3$N+CH–" read —RR'$_3$N+OH– —; column 12, line 72, for "strokes" read —stokes—; column 16, line 55, for "epoxide" read —epoxides—; line 74 and column 18, line 6, for "diphenolic acid", each occurrence, read —Diphenolic Acid—; column 23, line 55, after "from" insert —about—; line 66, before "wherein" insert —alcohol—.

Signed and sealed this 17th day of May 1960.

[SEAL]

Attest:
KARL H. AXLINE,
*Attesting Officer.*

ROBERT C. WATSON,
*Commissioner of Patents.*